Figure 1:
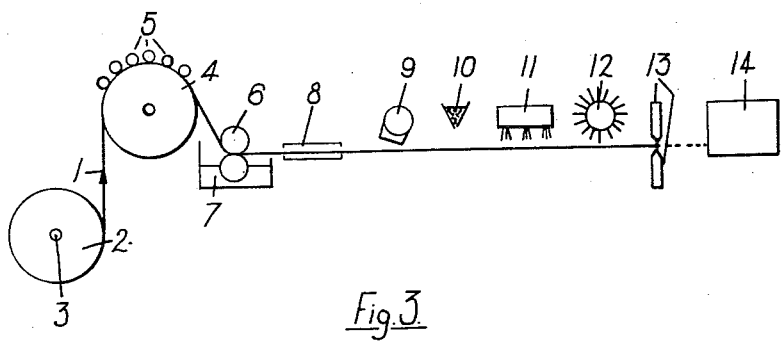

June 8, 1965  F. BOOTH ETAL  3,188,243

METHOD OF MAKING PERMEABLE DIAPHRAGM MATERIAL

Filed March 17, 1961 2 Sheets-Sheet 1

Inventor
FRANK BOOTH
MICHAEL P. LATHAM
By *Imirie & Smiley*
Attorneys

June 8, 1965 F. BOOTH ETAL 3,188,243
METHOD OF MAKING PERMEABLE DIAPHRAGM MATERIAL
Filed March 17, 1961 2 Sheets-Sheet 2
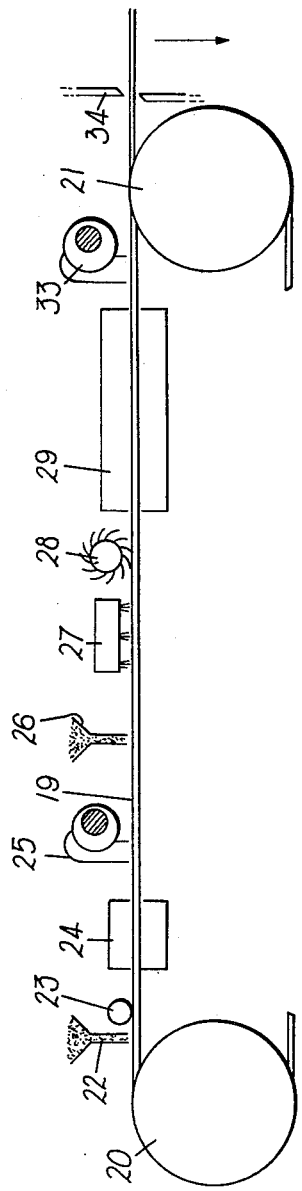
Inventor
FRANK BOOTH
MICHAEL P. LATHAM By
Attorneys United States Patent Office 3,188,243
Patented June 8, 1965

3,188,243
METHOD OF MAKING PERMEABLE
DIAPHRAGM MATERIAL
Frank Booth, Loughton, Essex, and Michael Paul Latham, Manchester, England, assignors to Oldham & Son Limited, Manchester, England, a corporation of Great Britain
Filed Mar. 17, 1961, Ser. No. 96,521
Claims priority, application Great Britain, Mar. 23, 1960, 10,344
2 Claims. (Cl. 136—148)

This application is a continuation in part of our application Serial No. 755,921, filed August 19, 1958, and now abandoned.

This invention relates to permeable diaphragm material and more particularly to permeable diaphragm material for use as an electric storage battery separator.

In permeable diaphragm material manufactured in the past, the pores present on the faces of the material have been of a non-uniform size, with the result that there has been a non-uniformity of permeability in the material. In cases where it is desired to control the passage of fluid between regions separated by the diaphragm it is important that the material should have a regular pore size. The control of the passage of fluid between regions may be, for example, by controlling the rate of flow or by way of controlling the nature of the constituents of the fluid that are able to pass through the diaphragm.

It is a main object of the present invention to provide a permeable diaphragm material having pores of a regular predetermined size.

According to the present invention there is provided permeable diaphragm material having pores of regular predetermined size comprising a base diaphragm material having an irregular pore size and a continuous network of a thermoplastic formed on the said base diaphragm material and extending over at least one face thereof, the network comprising abutting finely divided particles of the thermoplastic sintered together at their points of contact and penetrating into the base diaphragm material so that the particles become consolidated with the base diaphragm material by penetration into the pores of the said material and the continuous network is keyed to the base diaphragm material, the interstices of the continuous network forming pores of regular predetermined size which are smaller than the pores of the base diaphragm material.

Instances of such diaphragms are, for example, electric storage battery separators, filtration elements of gas cleaning filters and filters for removing from the atmosphere particles of radioactive fall-out.

In electric storage battery separators it has been a difficulty that the non-uniformity of permeability of the separator arising from the presence of pores of non-uniform size on its faces has resulted in a non-uniformity in the rate of travel of electrolyte through the separator and hence in turn in irregularity in chemical reaction on the plates across their area. The life of the plates has thus been shortened in comparison with that which would be obtainable if the reaction were uniform.

It is accordingly a more specific object of the present invention to provide an improved form of electric storage battery separator material having pores of regulated size.

It is a further object of the present invention to provide an electric storage battery separator material which is comprised by two layers of porous material which are joined together in such a manner that the layers remain continuously joined over the whole of their contacting surfaces even after long periods of use.

Composite electric storage battery separators made from two layers of material superficially stuck together have been previously proposed. For example, in U.S. Patent No. 2,297,248 there is disclosed a porous diaphragm composed of two layers of thermoplastic materials, one layer having larger pores and the other having smaller pores, the two layers being formed separately and made to adhere to each other by superficially softening each layer either by means of a solvent or by means of heat and compression.

However the separators according to the present invention differ from such prior separators in that an additional bond between the two layers is provided due to the projections of thermoplastic from the network which extend into the base separator material.

According to this aspect of the present invention there is provided an electric storage battery separator material having pores of regular predetermined size comprising a base separator material having an irregular pore size and a continuous network of a thermoplastic formed on the said base separator material and extending over at least one face thereof, the network comprising abutting finely divided particles of the thermoplastic sintered together at their points of contact and penetrating into the base separator material so that the particles become consolidated with the base separator material by penetration into the pores of the said material and the continuous network is keyed to the base separator material, the interstices of the continuous network forming pores of regular predetermined size which are smaller than the pores of the base separator material.

Conveniently electric storage battery separator material is formed with ribs on one face and the continuous network is formed to extend over the ribbed face.

The base separator material to which the regulating treatment is applied may be of various kinds, for example, cellulosic pulp, a mixture of glass fibres and cellulosic pulp, or a sintered thermoplastic powder.

In order to manufacture the diaphragm material with pores of regulated size, the present invention provides a process of producing from a base diaphragm material having pores of irregular size a permeable diaphragm material having smaller and regular pores, which process comprises applying to a face of the base diaphragm material finely divided particles of thermoplastic so as to form an adhering coating of the abutting particles on the face and penetrating into the base material, and then sintering the abutting particles together at their points of contact so as to form a continuous network of thermoplastic keyed to the base diaphragm material by penetration into the pores of the said material.

Instead of working on a preformed base diaphragm material or base separator material, the production of the base material and the subsequent regulation of the pore size may be carried out in a continuous process.

From this aspect, therefore, the present invention provides a process of producing an electric storage battery separator material including forming an electric storage battery base separator sheet material which has an irregular pore size and then producing a separator sheet material having smaller and regular pores by applying to the face of the base separator sheet material finely divided particles of thermoplastic so as to form an adhering coating of abutting particles on the face and penetrating into the base separator material, and then sintering the abutting particles together at their points of contact so as to form over the face a continuous network of thermoplastic keyed to the base separator material by penetration into the pores of the said material and having interstices which constitute the pores of regular size.

The electric storage battery base separator sheet material may be formed, according to one aspect of the present invention, by impregnating a fibrous sheet with an acid resisting resin and then curing the impregnated fibrous sheet.

The acid resisting resin may be a phenolic resin, such as Bakelite R568, Bakelite 10993, and Lowes AC477, or a cresylic resin, such as Bakelite 10856/1.

Alternatively, the base separator material may comprise a thermoplastic resin, such as for example, a polyvinyl ester, a polyvinyl ether, a polyvinylidene ester, polystyrene, polyacrylonitrile, and polymeric esters of acrylic and methacrylic acids, and polyethylene. Polyvinyl resins which are especially suitable are those obtained from polyvinyl halides, such as polyvinyl chloride, or copolymers thereof with vinyl esters such as vinylacetate and also polyvinylacetate itself, and polymethylmethacrylate. In one preferred embodiment of the invention the base separator material is formed by sintering together at about 225° C. particles of polyvinyl chloride powder having an average particle diameter size of about 10 microns.

The thermoplastic material which is used to form a continuous network on the base separator material or the base diaphragm material is a thermoplastic resin of the same types as those recited for the thermoplastic base separator material. When a thermoplastic base material is used the continuous network of thermoplastic formed thereon may be of the same or a different thermoplastic material, for example a high density polyethylene may be used for the base with a polyvinyl chloride network thereon, while the embodiment to be described uses a polyvinyl chloride base with a polyvinyl chloride network thereon.

In order to obtain the maximum degree of adhesion of the eventual continuous sintered network to the base separator material, the particles of thermoplastic may be brushed over the face of the base separator material so that particles penetrate into the existing pores of the base separator material and become consolidated with it. The particles penetrating into the pores will then on sintering together provide the network with projections which are embedded in these pores underneath the covering network of thermoplastic, which is thereby keyed to the base separator material.

Brushing in may conveniently be effected by means of a rotary brush underneath which the base separator material covered with particles passes in the form of a continuous web.

When operating in a continuous manner it is also preferred to advance the base separator material in the form of a continuous web past a falling curtain of the particles and then leveling off the layer of particles deposited by the curtain to effect a uniform distribution of particles over the face of the separator material prior to brushing in.

Figure 3:
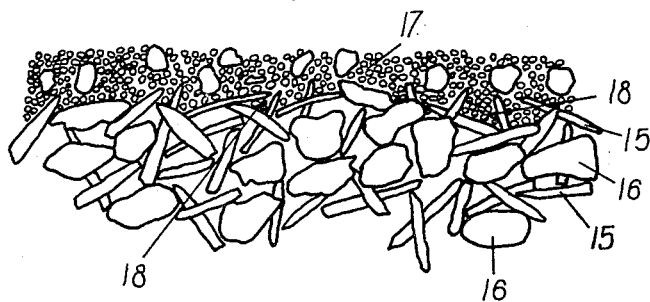
Figure 4:
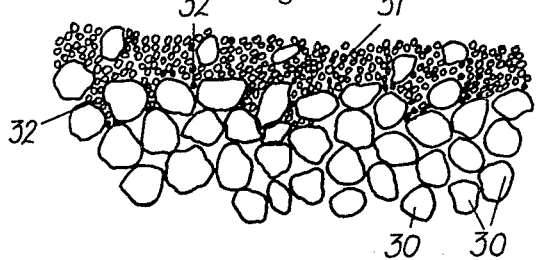

In order that the invention may be more clearly understood, two embodiments thereof will now be described by way of example with reference to the accompanying drawings in which:

FIGURE 1 shows in diagrammatic form apparatus employed for continuous production of electric storage battery separators made from glass fibres and cellulosic pulps, FIGURE 2 shows in diagrammatic form apparatus employed for the continuous production of electric storage battery separators made from a base separator material of sintered thermoplastic powder, FIGURE 3 is a magnified cross section through a surface of a separator comprising a base material of glass fibres and cellulosic pulp, and FIGURE 4 is a magnified cross section through a surface of a separator comprising a sintered thermoplastic powder base material.

In FIGURE 1 of the accompanying drawings, a continuous web 1 of base separator material comprising about 10% glass fibres and 90% cellulosic pulp and impregnated with a water soluble phenolic resin is drawn from a roll 2 of the material wound on an axle 3 and passed over drum 4 associated with rollers 5 for the purpose of ribbing the web. The drum 4 is grooved, and the rollers 5 provided with fins, the grooves and fins being arranged so as to progressively rib the upper face of the web from the middle of the web outwardly as it passes over the drum 4.

The preferred form of construction for ribbing drum 4 and rollers 5 is shown in United States patent specification No. 2,811,745.

After being ribbed, the web passes through a kiss-coater 6 of well known form in a bath 7 of strong resin solution so as to apply the additional resin to the web and then through a curing oven 8 maintained at a temperature of about 250° C.

After curing the web is cooled to a temperature of not more than 150° C. by a blower 9 and then advances in turn under a vibrating hopper 10 charged with particles of polyvinyl chloride, a stationary brush 11 with bristles of natural bristle or nylon and a rotating brush 12 again with bristles of natural bristle or nylon.

The vibrating hopper 10 is disposed about 6 inches above the web 1 and produces a falling curtain of polyvinyl chloride particles which rain on to the ribbed face of the web and the coating so produced is levelled off and the surplus particles removed by the stationary brush 11, the particle then being forced into the existing pores of the web of base separator material by the rotating brush 12 so that the particles become consolidated with the base separator material. After passing under the rotating brush 12 the web 1 has had all surplus particles removed from it and only those particles remain which are adhering to the web 1.

The web is then chopped into sheets of the size required for the battery separators by cutters 13 and the sheets transported to oven 14 where they are heated to a temperature of about 150° C., in order to sinter the particles together.

As shown in FIGURE 3 the whole upper face of the web, of glass fibres 15 and cellulosic pulp 16, is thus covered by a continuous network 17 of polyvinyl chloride derived from the sintering together of the polyvinyl chloride particles at their points of contact. The network 17 has inwardly directed feet 18 located in the previously existing pores of the base material and constituted of conglomerations resulting from the sintering together of the particles brushed into the pores by rotary brush 12. These feet serve to enhance the grip of the network so that it is positively keyed to the base separator material, in addition to the inherent adhesion of the thermoplastic network 17 to the glass fibres 15 and cellulosic pulp 16 of the web 12.

The interstices of the network thus constitute the new pores of regular predetermined size of the ribbed face, and according to the size of the particles of polyvinyl chloride applied and the extent of the sintering so may the size of the new pores provided for the ribbed face be regulated.

Where polyvinyl chloride is employed, it is preferred to use a mixture of finely divided particles of polyvinyl chloride, the predominant constituent having an average particle diameter size of ½ to 1 micron, and the other constituent having an average particle diameter size of 10 microns. In this case sintering is effected for ten minutes at 150° C. to give a substantially uniform pore size of average diameter of about ½ micron from a web having an average pore diameter of about 40 microns.

The nature of the thermoplastic particles employed depends on the nature of the base separator material, in view of the need for adhesion between the thermoplastic and the separator material, but in the instance of the material referred to previously, namely, about 10% glass fibres and 90% cellulosic pulp, polyvinyl acetate, polyethylene, or polymethylmethacrylate particles may be usefully employed instead of polyvinyl chloride particles.

One of the forces involved in the adherence of polyvinyl chloride particles is that of electro-static attraction due to the creation of static charges on the surface of the base separator material and/or the particles during the application of the particles to the base separator material.

An additional step may, if desired, be included in the above sequence of operations in order to effect additional strengthening and/or dyeing of the ribs. After the web leaves the rotating brush 12 and before it passes to the cutters 13 it is passed through a kiss-coater similar to the kiss-coater 6 where additional resin and/or dye is applied to the ribs. The nature of the resin or dye employed should be such that the material applied by the additional kiss-coater can be effectively dried to a non-tacky state by the oven 14, which, as mentioned above, operates at a temperature of about 150° C. Suitable resins are therefore those which are cured at the temperature attained in the oven 14 such as plasticised polyvinyl chloride lattices which may, if desired, be dyed and those which can be dried in the oven 14 and then subsequently cured by contact with the battery acid, such as furane resins. When only dye is applied by the additional kiss-coater, the dye medium or solvent must be one, such as water, which will be volatilised in the oven 14.

In a modified form of operation of the apparatus, a small quantity of polyvinyl chloride particles is positioned against the stationary brush 11 on the vibrator side prior to commencing operation so as to ensure that the coating is substantially uniform across the width of the web 1, as well as level.

Again, the apparatus may be modified so that the quantity of surplus particles which builds up by the stationary brush 11 automatically controls the rate of vibration of the hopper and hence the density of the curtain, so as to keep this quantity substantially constant.

By means of the method described with reference to FIGURE 1, it is possible to provide an electric storage battery separator material having a fibrous base with pores of a controlled size which may moreover be considerably smaller than is obtainable with the conventional prior methods. Furthermore, the covering thermoplastic network increases the resistance of the ribbed face, which is next to the positive plate in use, to oxidation, and also renders the separator stronger and more rigid, thus enabling a thinner base and/or less resin to be employed in the manufacture of the base separator material.

Referring to FIGURE 2, there is shown a conveyor belt 19 which is continuously driven by wheels 20 and 21. A vibrating hopper 22 allows particles of polyvinyl chloride powder to fall on the conveyor belt 19. The particles of polyvinyl chloride, which have an average particle diameter size of about 10 microns, cling together and form a layer on the conveyor belt 19. The layer of polyvinyl chloride particles on the conveyor belt 19 passes under a forming roller 23 which consolidates the layer to a required thickness and shape. The forming roller 23 provides ribs in the polyvinyl chloride powder.

The formed layer of polyvinyl chloride powder is carried by the conveyor belt 19 through an oven 24 which is maintained at a temperature of 225° C. and the thermoplastic powder is within the oven 24 for approximately 3 minutes. During its passage through the oven 24 the polyvinyl chloride powder is sintered together to form a base separator material. On emerging from the oven 24, the base separator material of sintered polyvinyl chloride powder passes beneath a blower 25 which cools it to a temperature of about 150° C.

The base separator material of sintered polyvinyl chloride powder is then advanced under a vibrating hopper 26 charged with a mixture of polyvinyl chloride particles, the predominating constituent having an average particle diameter of from ½ to 1 micron, and the other constituent having an average particle diameter of about 10 microns. The vibrating hopper 26 produces a falling curtain of polyvinyl chloride particles which rain on to the face of the base separator material to produce a coating.

From beneath the hopper 26, the base separator material with its coating of thermoplastic particles passes in turn beneath a stationary brush 27 with bristles of natural bristle or nylon, and a rotating brush 28, again with bristles of natural bristle or nylon.

The coating of thermoplastic on the base separator material is leveled off and surplus particles removed by the stationary brush 27. Particles are then forced into the existing pores of the base separator material by the rotating brush 28 so that the particles become consolidated with the base separator material. After the brushing-in operation only those particles remain on the diaphragm which are adhering to it, so that these particles form an adhering coating on the base separator material.

As in the previous embodiment, one of the forces involved in the adherence of the polyvinyl chloride particles is that of electrostatic attraction due to the creation of static charges on the surface of the base separator material and/or the particles during the application of the particles to the base separator material.

The base separator material with its adhering coating of polyvinyl chloride particles is then passed to an oven 29 where it is heated to a temperature of about 150° C. for ten minutes in order to sinter the adhering particles together. Alternatively the base separator material with its adhering coating of polyvinyl chloride particles may be heated to a temperature of about 180° C. in the oven 29, and in this case would only remain in the oven 29 for approximately 20 seconds.

As shown in FIGURE 4 the whole upper face of the base separator material of sintered thermoplastic 30 is thus covered by a continuous network 31 of polyvinyl chloride derived from the sintering together of the polyvinyl particles at their points of contact, and including inwardly directed feet 32 which are located in the previously existing pores of the base separator material and which are constituted of conglomerations resulting from the fusing together of the particles brushed into the pores by the rotating brush 28. These feet serve to enhance the grip of the network to the base separator material additional to the inherent adhesion of the thermoplastic network to the base separator material, so that the continuous network is keyed to the base separator material.

By the sintering of the thermoplastic particles in the oven 29 a continuous network is formed having a substantially uniform pore size of average diameter about ½ micron.

After its passage through the oven 29 the base separator material passes beneath a blower 33 which cools it down from the temperature of the oven 29 before it is passed from the conveyor belt 19 to cutters 34 which chop it into sheets of the size required for battery separators.

By means of the embodiment of the invention described with reference to FIGURES 2 and 4 it is possible to provide an electric storage battery separator having a base separator material of sintered thermoplastic powder with pores of a controlled size.

The continuous network is firmly keyed on the base separator material of sintered thermoplastic powder on account of the feet of projection from the network sintering together with the particles of the base.

Although in the embodiment of the invention described with reference to FIGURES 2 and 4 the base separator material and the continuous network are of the same thermoplastic material, polyvinyl chloride, it is perfectly possible for the network to be of a different thermoplastic from the base separator material.

It is equally within the scope of the invention for the network to be applied to the flat surface of the base separator material or even to both surfaces thereof.

Again the forming roller 19 may, if desired, be heated and the apparatus used can be varied, for example, by omitting the stationary brush 23 or one or both of the blowers 21 and 26.

Also the surfaces of the base separator material to which the continuous network is applied may be flat instead of ribbed, or may be formed flat and have ribs applied to it at a later stage, but before the continuous network is formed.

The porosity of the diaphragm materials can be conveniently compared by subjecting the diaphragms separately to a cloud of particles of about ½ micron size and determining the proportion of the cloud of particles which penetrates through the diaphragm in each case in a given time. Comparative tests have been performed by the applicants on separators made from different materials and the penetration determined by these tests expressed as the percentage of the penetration through a standard membrane. It was found that the best results obtainable with prior separator materials were a penetration in the range of 1-5%, which was liable to increase to the order of 20% after use of the separator. However with a separator according to the present invention a penetration of 1% was regularly obtained and the penetration was maintained at 1% even after long periods of use.

We claim:

1. A process of producing a diaphragm having a small and regular pore size, comprising the steps of forming a sheet base diaphragm material having an irregular pore size, advancing the sheet base diaphragm material as a continuous web under and past a falling curtain of finely divided thermoplastic particles, brushing with a bristled implement the thermoplastic particles over the face of the base sheet diaphragm material to force some of the particles into the porous sheet base diaphragm material and to remove surplus particles so as to leave only a thin, self adherent coating of the thermoplastic particles, and heating the sheet base diaphragm material with its self adherent coating of thermoplastic particles to sinter together the abutting thermoplastic particles at their points of contact so as to form over the face of the sheet base diaphragm material a thin, fine lattice work of thermoplastic in a continuous network keyed to the sheet base diaphragm material by feet penetrating into the pores of the said material, the fine lattice work having interstices which constitute the pores of regular size.

2. A process of producing a diaphragm having a small and regular pore size, comprising the steps of forming a sheet base diaphragm material having an irregular pore size, advancing the sheet base diaphragm material as a continuous web under and past a falling curtain of a mixture of finely divided thermoplastic particles, the mixture including at least two constituents of different average particle size, brushing with a bristled implement the applied mixture over the face of the sheet base diaphragm material to force some of the particles into the porous sheet base diaphragm material and to remove surplus particles from the porous sheet base diaphragm material so as to leave only a thin, self adherent coating, and heating the sheet base diaphragm material with its self adherent coating of the mixture of thermoplastic particles to sinter together the abutting thermoplastic particles of the self adherent coating at their points of contact so as to form over the face of the sheet base diaphragm material a thin, fine lattice work of thermoplastic in a continuous network keyed to the sheet base diaphragm material by feet penetrating into the pores of the said material, the fine lattice work having interstices which constitute the pores of regular size.

References Cited by the Examiner

UNITED STATES PATENTS

| 2,004,304 | 6/35 | Wells | 136—145 |
| 2,297,248 | 9/42 | Rudolph. | |
| 2,414,177 | 1/47 | Smith | 18—56 |
| 2,465,493 | 3/49 | Strickhouser et al. | 136—145 |
| 2,487,233 | 11/49 | Gerke | 18—56 |
| 2,673,887 | 3/54 | Booth | 136—148 |
| 2,734,095 | 2/56 | Mears et al. | |

FOREIGN PATENTS

| 537,181 | 6/41 | Great Britain. |
| 678,719 | 9/52 | Great Britain. |
| 749,778 | 5/56 | Great Britain. |

JOHN H. MACK, *Primary Examiner.*
JOHN R. SPECK, *Examiner.*